Oct. 11, 1949.  J. P. SILVA  2,484,754
CARRIAGE FOR TRUCKS
Filed July 12, 1946

INVENTOR.
Joseph P. Silva.
BY William F. Nickel
ATTORNEY.

Patented Oct. 11, 1949

2,484,754

UNITED STATES PATENT OFFICE 2,484,754

CARRIAGE FOR TRUCKS

Joseph P. Silva, Bayonne, N. J.

Application July 12, 1946, Serial No. 683,290

9 Claims. (Cl. 305—4)

This invention is an improvement in carriages, and particularly carriages adapted to support a hand-operated truck and carry it up and down stairways and over obstructions and rough places that cannot easily be surmounted by the wheels of the truck.

An important object of the invention is to provide a carriage that is light in weight but strong enough to bear the truck and its full load such as a heavy trunk, refrigerator or the like, with the wheels of the truck lifted and clear of the floor or ground, and designed so that it can be pushed or dragged with a minimum of friction to the point at which the load is delivered. To this end the carriage is built of light metal bars joined to form a framework enveloped by an endless movable anti-frictional tread, extending from end to end, and longitudinal supporting members for the truck over said tread above the top of the framework. The entire construction is simple and inexpensive, but well calculated to serve the intended purpose.

The drawings show one form of the invention, which of course may be embodied in other forms differing in detail but containing the same essential features.

Figure 5:
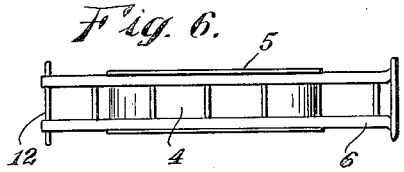
Figures 5 and 6 are respectively side and top views to show how a truck is supported on said carriage.
Figure 6:
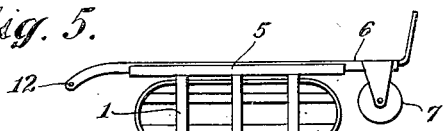
Figure 1:
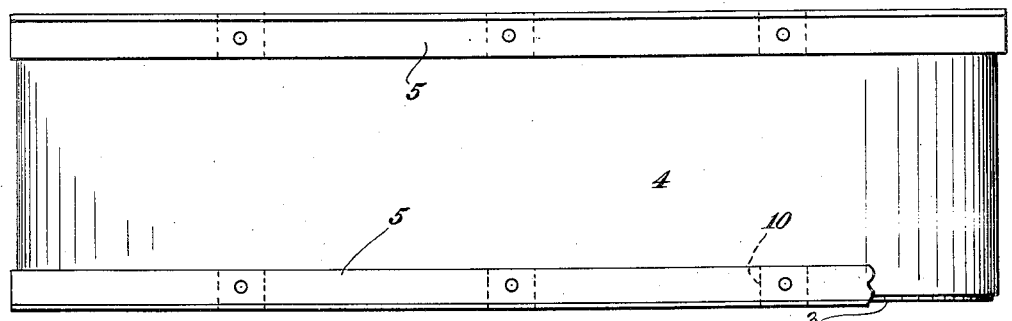
Figure 1 is a top plane of a carriage according to this invention.
Figure 2:
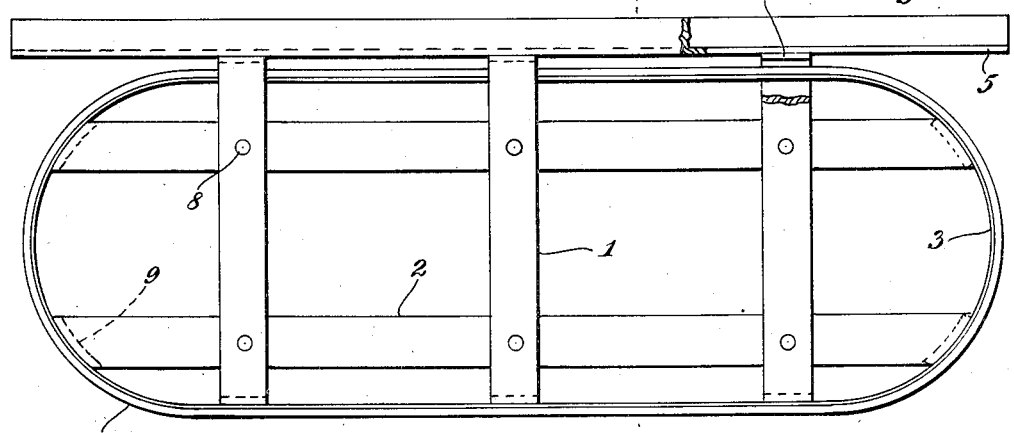
Figure 2 is a side view of same.
Figure 3:
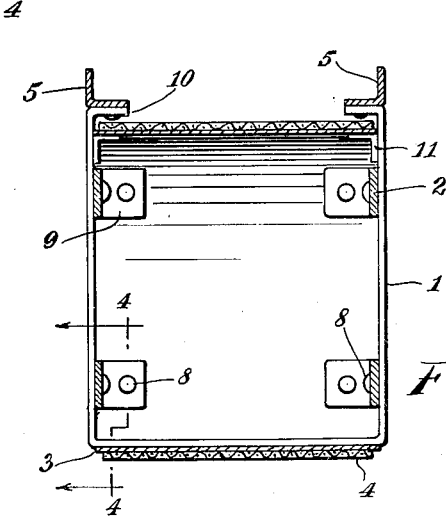
Figure 3 is a vertical cross section on line 3—3 of Figure 2.
Figure 4:
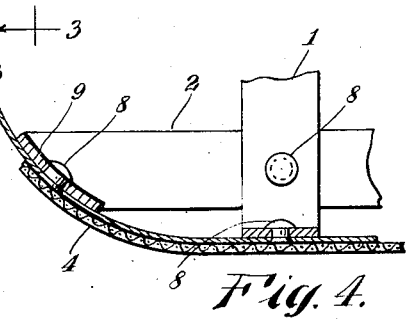
Figure 4 is a vertical sectional view of a detail on line 4—4 of Figure 3.

The carriage is made of a framework comprising upright U-shaped members 1 of steel or other suitable metal, in transverse position, united by longitudinal bars 2, at both sides. The framework is covered on the top, bottom and sides by a strong but relatively thin metal shell 3 open from side to side, oval in shape and rounded at both extremities. This framework is enveloped by an endless tread or belt 4, which overlies the whole outer face of the shell, is of the same width, and free to move longitudinally of the framework while being retained in position. This belt is made of canvas or some other suitable fibrous material, and enough grease is supplied to the outside of the shell 3 to enable the belt or tread to slide thereon when the carriage is impelled from one place to another. On top of the carriage, and clear of the framework and the tread is a pair of supporting members in the form of longitudinal angle bars 5, the vertical webs of which run along the outer sides thereof. The carriage is utilized by putting an ordinary hand-propelled truck 6 on the top, resting on the bars 5, with the wheels 7 lifted from the floor or ground. The carriage can then be pulled or pushed and the truck, fully loaded, is easily moved about, because the friction between the tread 4 and shell 3 is greatly diminished and the tread 4 slips freely as the vehicle and the loaded truck are dragged up a stairway or over rough and broken ground. The truck may have legs near the handle 12.

The members 1 and bars 2 are secured by rivets 8 or by welding, and the ends of the bars 2 are bent over inward at the extremities to form inclined curved projections 9 affixed by similar welding or rivets 8 to the inner surface of the round ends of the shell 3. The two upright arms or sides of the members 1 are extended above the shell 3 and tread 4, and their upper extremities are bent inward to form horizontal projections 10, to which the bars 5 are riveted or otherwise fastened. On their inner faces near the tops these two arms are made fast to the inside faces of the shell at the edges by angle pieces 11.

The belt 4 is confined between the bent over extremities 10, so that it cannot be displaced and it fits the shell 3 loosely enough to allow lubricant to be discharged under it by a suitable grease gun or the like, to keep enough of the lubricant between the two to diminish the frictional contact thereof as required. The truck could be a truck of any type, but is illustrated as having one end upturned with wheels 7 thereat. The body of the truck is made of two side beams connected by cross bars and with the wheels at one extremity; and a transverse handle bar 12 at the other. The truck with its load is simply backed up to one end of the carriage with the wheels close thereto, and then lowered to rest on the supporting members 5, with the wheels 7 lifted, and even in contact with the tread 4 at one end of the shell. The loaded truck and the carriage can be pulled with relatively little effort by taking hold of the handle 12.

From the foregoing description it is plain that the invention is well calculated to gain all the desired objects. The carriage can be produced at low cost, is simple and easy to construct, calls for no great strength to move it about, and is very unlikely to get broken or out of order.

In practice, changes in detail could be made without deviating from the principle of the invention. The carriage is shown as consisting of a single shell or track and a single belt, but two tracks and belts, one under each side of the truck could be used.

Having described my invention, what I believe to be new is:

1. A carriage having a framework, a smooth shell enveloping the framework, means on the exterior of the shell to reduce friction, said shell and said means extending from one side of the carriage to the other, and longitudinally extending members carried by the framework above the shell to support a loaded truck thereon.

2. The carriage according to claim 1 wherein said means to reduce friction is a longitudinally extending endless lubricated belt enveloping the shell.

3. A carriage having a framework comprising upright U-shaped members in transverse position, longitudinally disposed bars affixed to the sides of said members, a shell open at the sides enveloping the top, bottom and ends of the framework, means on the exterior of the shell to reduce friction, said shell and said means extending from one side of the carriage to the other, and longitudinal members carried by the framework above the shell to support a loaded truck thereon.

4. The carriage according to claim 3 wherein said shell has rounded ends and the friction-reducing means is an endless longitudinally extending lubricated belt enveloping the shell.

5. The vehicle according to claim 1 wherein said shell has parts at the sides projecting above said friction-reducing means and the sides of the top of the shell, to which said members are affixed.

6. A carriage having a smooth track extending from side to side thereon and having rounded ends, means covering the exterior of the track and enveloping same to reduce friction, and members attached to the track and extending above the latter to support a loaded truck thereon above the track.

7. A carriage comprising a smooth endless track extending from side to side thereon and having rounded ends, a lubricated belt covering the track and enveloping it, and supporting means extending above the track.

8. A carriage having a framework comprising upright U-shaped members in transverse position, longitudinally disposed bars affixed to the sides of said members, a shell open at the sides enveloping the top, bottom and ends of the framework, means on the exterior of the shell to reduce friction, and longitudinal members carried by the framework above the shell to support a loaded truck thereon, said shell having rounded ends, and said friction-reducing means being an endless longitudinally extending lubricated belt enveloping said shell, the U-shaped members projecting above the top of the shell at the sides and having their upper ends bent over inward, and the supporting members being affixed to said ends above said belt, the latter being confined between said members.

9. A carriage having a framework comprising upright U-shaped members in transverse position, longitudinally disposed bars affixed to the sides of said members, a shell open at the sides enveloping the top, bottom and ends of the framework, means on the exterior of the shell to reduce friction, and longitudinal members carried by the framework above the shell to support a loaded truck thereon, the ends of the shell being rounded, and the extremities of the side bars having inturned curved projections affixed to the inner surfaces of the rounded ends of the shell.

JOSEPH P. SILVA.

REFERENCES CITED

The following references are of record in the file of this patent:

UNITED STATES PATENTS

| Number | Name | Date |
|---|---|---|
| 359,468 | Peirce | Mar. 15, 1887 |
| 1,003,025 | Baker | Sept. 12, 1911 |
| 2,301,341 | Stevens et al. | Nov. 10, 1942 |

FOREIGN PATENTS

| Number | Country | Date |
|---|---|---|
| 43,719 | Switzerland | May 5, 1908 |